United States Patent [19]

Pelton et al.

[11] 3,970,105
[45] July 20, 1976

[54] TOROIDAL PRESSURE REGULATOR

[75] Inventors: Peter G. Pelton, Carol Stream; Obert M. Ostrem, Westmont, both of Ill.

[73] Assignee: Continental Can Company, Inc., New York, N.Y.

[22] Filed: June 16, 1975

[21] Appl. No.: 587,484

[52] U.S. Cl. .............................. 137/498; 137/504; 137/517; 138/45
[51] Int. Cl.² ........................................ F16K 31/12
[58] Field of Search ............ 222/55, 59, 386.5, 394, 222/95, 96, 396, 212, 213, 491, 492, 493, 495–497, 513, 528, 529; 251/4, 5; 137/517, 525, 498, 504; 138/45, 46

[56] References Cited
UNITED STATES PATENTS

| | | | |
|---|---|---|---|
| 1,577,243 | 3/1926 | Bridges | 137/517 |
| 2,568,519 | 9/1951 | Smith | 138/45 |
| 2,813,541 | 11/1957 | Beller | 137/517 |
| 2,815,923 | 12/1957 | Clark | 138/46 |
| 2,816,572 | 12/1957 | Pratt | 137/517 |
| 2,946,342 | 7/1960 | Dopplmaier | 137/517 |
| 3,178,075 | 4/1965 | Riedl et al. | 222/396 |

FOREIGN PATENTS OR APPLICATIONS

| | | | |
|---|---|---|---|
| 222,794 | 10/1924 | United Kingdom | 138/45 |

Primary Examiner—Robert B. Reeves
Assistant Examiner—H. Grant Skaggs
Attorney, Agent, or Firm—John J. Kowalik; Joseph E. Kerwin; William A. Dittmann

[57] ABSTRACT

A pressure regulator particularly adaptable for use in aerosol cans in which a chamber is provided having inlet and outlet ports, and a pressure reactive diaphragm, and a dimensionally changeable inlet throttling body, positioned in the chamber, is dimensionally controlled to close and open the inlet port by variations of pressure in the chamber.

3 Claims, 5 Drawing Figures

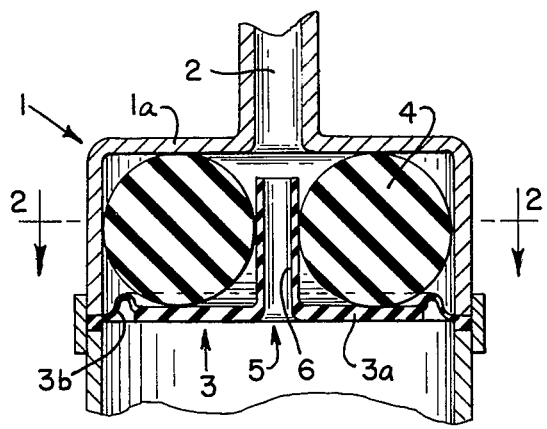
FIG-1-
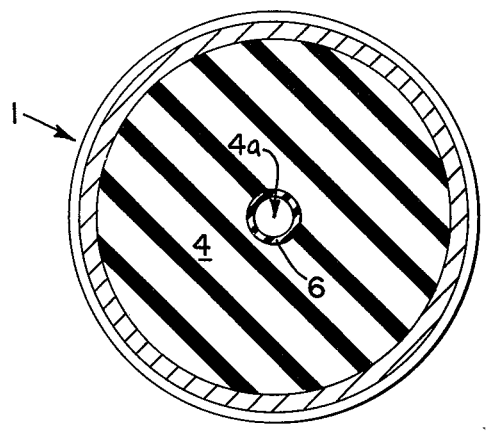
FIG-2-
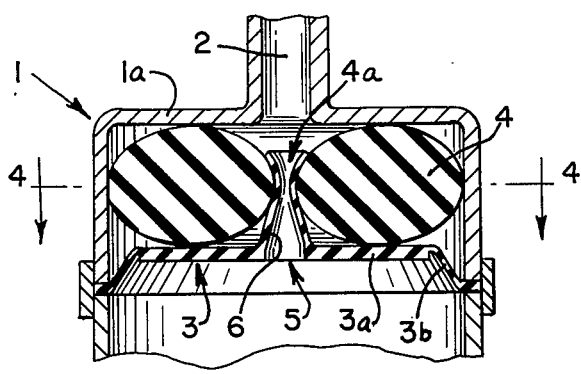
FIG-3-
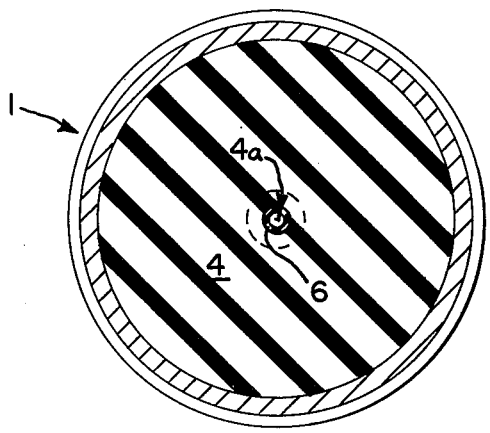
FIG-4-
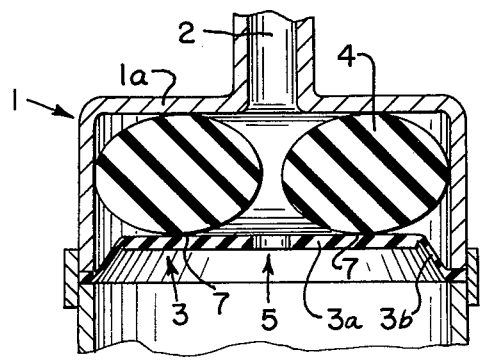
FIG-5-

TOROIDAL PRESSURE REGULATOR

SUMMARY OF THE INVENTION

The present invention relates to a new and useful fluid pressure regulator and more particularly to a pressure regulator adaptable for use in aerosol cans.

Currently, the vast majority of the aerosol cans utilize fluorohydrocarbon propellants. Propellant, in liquid form, is enclosed in the can body, wherein a portion vaporizes and pressurizes the container. As product is dispensed, further propellant vaporizes, thereby maintaining the dispensing force at a constant level.

Great concern has recently been expressed concerning the possible deleterious effects upon the atmosphere of these propellants. Several alternate pressurizing media have been proposed, including compressed gases such as nitrogen, carbon dioxide and air. These media, however, are commercially unacceptable because the dispensing force produced decreases as the product is dispensed.

Accordingly, the primary object of the present invention is to provide an improved pressure regulator which will maintain a constant dispensing force in an aerosol can pressurized with a compressed gas.

It is a further object of the invention to provide an improved pressure regulator which is compact and operable in any orientation.

It is another object of the present invention to provide an improved pressure regulator which is inexpensive and easily manufactured.

With the above and other objects in view that will hereinafter appear, the nature of the invention will be more clearly understood by reference to the following description, the claims and the several views illustrated in the accompanying drawings.

DESCRIPTION OF THE DRAWINGS

FIG. 1 is a longitudinal, cross-sectional view of one embodiment of the invention showing the inlet throttling body in the relaxed condition.

FIG. 2 is a cross-sectional view taken substantially along line 2—2 of FIG. 1.

FIG. 3 is a cross-sectional view similar to FIG. 1 showing the inlet throttling body in the compressed condition.

FIG. 4 is a cross-sectional view taken substantially along line 4—4 of FIG. 3.

FIG. 5 is a cross-sectional view of a second embodiment of the invention.

DESCRIPTION OF THE FIRST PREFERRED EMBODIMENT (FIGS. 1–4)

The invention is illustrated with a double-ended, hollow, substantially cylindrical, preferably steel, regulator body 1 having an end panel 1a with an outlet port 2 at one end, a displaceable diaphragm member 3 at the second end, and an internally contained inlet throttling body 4.

The diaphragm member 3 comprises a substantially flat and rigid plate element 3a formed preferably of an elastomeric material and a peripheral extensible bellows element 3b which is sealingly attached to the regulator body 1. An inlet port 5 is formed in the plate element 3a opposite the outlet port 2. A deformable inlet tube 6 extends into the regulator body 1 from the inlet port 5.

The inlet throttling body 4 is a deformable body with a central passage 4a, preferably, but not necessarily, a torus in shape. The body 4 is oriented in the regulator body 1 with the passage 4a aligned with the inlet and outlet ports 2 and 5. The inlet tube 6 passes through the passage 4a.

In operation, the dispensing valve (not shown) on the outlet port 2 is initially closed and the pressure within the regulator body 1 equals the pressure of the supply source (not shown). The inlet throttling body 4 is in the relaxed condition (FIGS. 1 and 2) and the inlet tube 6 is undeformed, permitting maximum flow from the source to the regulator body 1.

When the dispensing valve is opened, the pressure in the regulator body 1 quickly drops to atmospheric pressure. The unbalanced pressure of the product on the diaphragm member 3 thereupon forces that member 3 toward the opposite end of the regulator body 1, compressing the inlet throttling body 4 between the plate element 3a and the end panel 1a. As the body 4 is compressed, it distorts such that the cross-sectional area of the passage 4a is reduced. This area reduction causes a constriction of the inlet tube 6 which throttles the flow from the source to the chamber 1.

As the pressure of the source drops, the force on the diaphragm member 3 decreases, resulting in a less severe compression of the inlet throttling body 4 and, consequently, a lessened constriction of the inlet tube 6. Thus, the cross-sectional area of the tube 6 is controlled by the pressure differential across the diaphragm member 3. As the source pressure decreases, the cross-sectional area of the tube 6 increases, thereby maintaining a constant mass flow rate from the source to the chamber 1. This, in turn, provides a constant dispensing pressure.

DESCRIPTION OF THE SECOND PREFERRED EMBODIMENT (FIG. 5)

This embodiment differs from the first in that the inlet throttling body 4 is sealedly attached to the inside of the regulator body 1 such that all of the product must pass through the passage 4a prior to being dispensed. Thus, the body 4 may be sealed against the end panel 1a along the line 7 as shown in FIG. 5, or against the plate element 3a or against the side of the regulator body 1. The inlet tube 6 is omitted, the constriction of the passage 4a itself serving to throttle the flow from the source.

We claim:

1. An improved pressure regulator comprising a double-ended hollow chamber member having outlet means at one end thereof and a pressure reactive member sealing the second end with inlet means therethrough, and inlet throttling means in said chamber member, said inlet throttling means being operable by said pressure reactive member to open and close said inlet means to maintain the pressure at a predetermined level in said chamber member, said pressure reactive member comprising a substantially flat and rigid plate element and a peripheral, extensible bellows element, said bellows element being attached to said chamber member, said inlet means comprising an opening in the center of said plate element, said throttling means comprising a body having a central passage therethrough, said body being oriented with the axis of said central passage substantially aligned with said passage in said plate element, said chamber member having a major axis and said place element of said pressure reactive member being displaceable along said major axis in response to pressure changes within said chamber member, said body being reformable consequent to axial displacement of said plate element of said pressure reactive member, the cross-sectional area of said central passage of said body being reduced consequent to compression of said body between planar elements perpendicular to said axis of said passage, said chamber member having an end panel at said first end, and said body being compressed between said plate element and said end panel consequent to axial displacement of said plate element toward said first end, said inlet means including a reformable tube member extending from said opening in said plate element through said central passage of said body, said compression of said body reducing the cross-sectional area of a portion of said tube member.

2. The invention as described in claim 1 wherein said body is a torus.

3. The invention as described in claim 1, wherein said body is formed of an elastomeric material.

* * * * *